United States Patent
Sasamura et al.

(10) Patent No.: US 11,492,706 B2
(45) Date of Patent: Nov. 8, 2022

(54) ELECTROLESS PALLADIUM PLATING SOLUTION AND PALLADIUM FILM

(71) Applicant: C. Uyemura & Co., Ltd., Osaka (JP)

(72) Inventors: Tetsuya Sasamura, Osaka (JP); Tatsushi Someya, Osaka (JP); Katsuhisa Tanabe, Osaka (JP); Shinsuke Wada, Osaka (JP); Eriko Furuya, Osaka (JP)

(73) Assignee: C. UYEMURA & CO., LTD., Osaka (JP)

( * ) Notice: Subject to any disclaimer, the term of this patent is extended or adjusted under 35 U.S.C. 154(b) by 20 days.

(21) Appl. No.: 16/968,981

(22) PCT Filed: Feb. 15, 2019

(86) PCT No.: PCT/JP2019/005535
§ 371 (c)(1),
(2) Date: Aug. 11, 2020

(87) PCT Pub. No.: WO2019/163665
PCT Pub. Date: Aug. 29, 2019

(65) Prior Publication Data
US 2021/0054508 A1  Feb. 25, 2021

(30) Foreign Application Priority Data
Feb. 20, 2018 (JP) .............. JP2018-027631

(51) Int. Cl.
C23C 18/44 (2006.01)
C23C 18/16 (2006.01)
B32B 9/04 (2006.01)

(52) U.S. Cl.
CPC .............. *C23C 18/44* (2013.01); *B32B 9/041* (2013.01); *C23C 18/16* (2013.01)

(58) Field of Classification Search
CPC .......... C23C 18/44; C23C 18/16; B32B 9/041
See application file for complete search history.

(56) References Cited

U.S. PATENT DOCUMENTS

2009/0081369 A1* 3/2009 Aiba .................. C23C 18/44
427/304
2017/0321327 A1 11/2017 Beck et al.

FOREIGN PATENT DOCUMENTS

| CN | 106191825 | 12/2016 |
|---|---|---|
| JP | 7-62549 | 3/1995 |
| JP | 2008174774 A * | 7/2008 |
| JP | 2008-184679 | 8/2008 |
| JP | 2008184679 A * | 8/2008 |
| TW | 201715081 | 5/2017 |

OTHER PUBLICATIONS

International Search Report dated Mar. 19, 2019 in International (PCT) Application No. PCT/JP2019/005535.
Office Action dated Jul. 2, 2019 in corresponding Japanese Application No. 2019-527470, with English machine translation.
Uemiya, et al., "Preparation of Thin Palladium Films by Use of an Electroless Plating Technique", Journal of the Chemical Society of Japan, No. 6, 1990, pp. 669-675, with partial English translation.
Extended European Search Report dated Oct. 19, 2021 in European Patent Application No. 19757250.6.
Office Action dated Dec. 20, 2021 in corresponding Chinese Patent Application No. 201980013443.5, with English language translation.
Office Action dated May 4, 2022 in corresponding Taiwanese Patent Application No. 108105535, with English language translation.

* cited by examiner

*Primary Examiner* — Dah-Wei D. Yuan
*Assistant Examiner* — Nga Leung V Law
(74) *Attorney, Agent, or Firm* — Wenderoth, Lind & Ponack, L.L.P.

(57) ABSTRACT

An electroless palladium plating liquid containing at least hydrazine or a salt thereof as a reducing agent, which has excellent bath stability in the vicinity of acidity to neutrality range, long-term stability, and is capable of suppressing the Pd film deposition rate decrease caused by elution of etching resist. An electroless palladium plating solution of the invention includes a palladium compound, hydrazine or its salt, at least one selected from a group consisting of a compound represented by the following formula (1) or its salt and a compound represented by the following formula (2) or its salt; and a pH of 8 or less, $NH_2NHCOR_1$ (1), $(NH_2NHCO)_2(R_2)n$ (2), wherein $R_1$ represents H, $NH_2$, an alkyl group having 1 to 10 carbon atoms, an alkoxy group having 1 to 10 carbon atoms, $NHNH_2$, or an aromatic group, wherein each of these groups may have a substituent; $R_2$ represents $(CH_2)$ or an aromatic group, wherein each of these groups may have a substituent; and n represents an integer of 0 to 10.

3 Claims, No Drawings

ELECTROLESS PALLADIUM PLATING SOLUTION AND PALLADIUM FILM

TECHNICAL FIELD

The present invention relates to an electroless palladium plating solution and a palladium plating film.

BACKGROUND ART

A surface treatment method such as Electroless Nickel Electroless Palladium Immersion Gold (ENEPIG) has been widely used for printed circuit boards, IC package mounting parts, terminal parts, and the like in the electronic industrial fields. The ENEPIG process produces a laminated plating film by sequentially forming an electroless nickel plating film, an electroless palladium plating film, and a displacement gold plating film.

The Pd film exhibiting good electric conductivity and excellent corrosion resistance has a greater role in the ENEPIG process. Electroless palladium plating mainly uses formic acid or hydrazine including salts thereof, hypophosphite, or phosphite as a reducing agent, See for example, Non-Patent Document 1 and Patent Document 1.

PRIOR ART DOCUMENT

Patent Document

Patent Document 1: JP H07-062549A

Non-Patent Document

Non-Patent Document 1: Preparation of thin Palladium Films by Use of an Electroless Plating Technique, Shigeyuki Uemiya et al, The Chemical Society of Japan, 1990, No. 6

SUMMARY OF THE INVENTION

Problems to be Solved by the Invention

The plating bath is typically required to have excellent bath stability. In recent years, substrates coated with an etching resist have been used for selective plating in the electronic industrial fields. However, electroless plating has problems that elution of an etching resist reduces the plating rate, also known as plating film deposition rate, and resist peeling during plating. Therefore, an electroless palladium plating bath hard to elute etching resist has been earnestly desired.

However, Non-Patent Document 1 describes that a hydrazine reducing Pd plating bath using only hydrazine as a reducing agent has poor bath stability, also known as self-decomposition. In addition, the present inventors have found that instability of hydrazine itself decreases a deposition rate of a plating film during a long term use of the plating bath, or decreases a deposition rate along with elution of an etching resist.

Also, a formic acid-reducing Pd plating bath using formic acid as a reducing agent has excellent bath stability and has been industrially used for a long time. However, the present inventors have found that the formic acid-reducing Pd plating bath is susceptible to elution of an etching resist, and resulted in decreasing a deposition rate and significantly reducing the deposition rate during a long term use of the plating bath which brings plating defects such as no plating and thin plating. As one industrially adaptable solution to the problems, application of activated carbon treatment to a plating bath eluting etching resist achieves maintaining deposition rate. However, this solution impractical in view of cost and productivity.

The present invention has been accomplished to solve the above problems. And an object of the present invention is to provide an electroless palladium plating solution containing at least hydrazine or its salt as a reducing agent, which has excellent bath stability, long-term stability of deposition rate in the vicinity of acidity to neutrality, and can suppress decrease of Pd film deposition rate caused by elution of etching resist.

Solution to Problem

The present invention includes followings:

[1] An electroless palladium plating solution including:
a palladium compound;
hydrazine or its salt;
at least one selected from a group consisting of
a compound represented by following formula (1) or its salt, and
a compound represented by following formula (2) or its salt; and
a pH of 8 or less.

$$NH_2NHCOR_1 \quad (1)$$

$$(NH_2NHCO)_2(R_2)n \quad (2)$$

(wherein
$R_1$ represents H, $NH_2$, an alkyl group having 1 to 10 carbon atoms, an alkoxy group having 1 to 10 carbon atoms, $NHNH_2$, or an aromatic group. Each of these groups may have a substituent.
$R_2$ represents $(CH_2)$ or an aromatic group. Each of these groups may have a substituent. And n represents an integer of 0 to 10)

[2] The electroless palladium plating solution according to above [1], further including a reducing agent other than hydrazine or its salt.

[3] The electroless palladium plating solution according to above [1] or [2], wherein the reducing agent other than hydrazine or its salt is at least one selected from a group consisting of formic acid or its salt, hypophosphorous acid or its salt, and phosphorous acid or its salt.

[4] A palladium film obtained by using the electroless palladium plating solution according to any one of above [1] to [3].

[5] An electronic equipment component including the palladium film according to above [4].

Advantageous Effects of the Invention

The present invention provides an electroless palladium plating solution having excellent bath stability and long-term stability of deposition rate in the vicinity of acidity to neutrality and capable of suppressing the Pd film deposition rate decrease caused by elution of etching resist.

DESCRIPTION OF EMBODIMENTS

The present inventors have been studied to solve the problems and achieved the object by an electroless palladium plating solution containing at least hydrazine or a its salt as a reducing agent and a specified additive.

The present invention will be described in more detail.

1. Electroless Palladium Plating Solution

An electroless palladium plating solution of the present invention (herein after may be called as an electroless Pd plating solution) contains a palladium compound; hydrazine or its salt; at least one selected from a group consisting of a compound represented by $NH_2NHCOR_1$ as formula (1) or its salt, and a compound represented by $(NH_2NHCO)_2(R_2)n$ as formula (2) or its salt (herein after may be called as "the compound of the formula (1) or (2)", or "the specified compound"); and the electroless Pd plating solution has a pH of 8 or less. A feature of the present invention resides in combined use of hydrazine or its salt as a reducing agent and a specified compound.

The palladium compound used in the present invention is a palladium ion supply source for palladium plating. Any water-soluble palladium compound can be used and examples of the water-soluble Pd compound are inorganic water-soluble palladium salts such as palladium chloride, palladium sulfate, palladium acetate, tetraammine palladium hydrochloride, tetraammine palladium sulfate, tetraammine palladium acetate, and tetraammine palladium nitrate; and organic water-soluble palladium salts such as dichloro ethylenediamine palladium. These palladium compounds may be used alone, or two or more of Pd compounds may be used in any combination. A Pd ion concentration in the electroless Pd plating solution is not limited but extremely low Pd ion concentration may significantly decrease a deposition rate of a plating film. Also, extremely high Pd ion concentration may cause abnormal precipitation to deteriorate film physical properties. Therefore, the content of the palladium compound in the plating solution as Pd ion concentration is preferably 0.01 g/L or more, more preferably 0.1 g/L or more, further preferably 0.3 g/L or more, still more preferably 0.5 g/L or more, and preferably 10 g/L or less, more preferably 5 g/L or less, further preferably 3 g/L or less. The Pd ion concentration is measured by atomic absorption spectrometry (AAS) using an atomic absorption spectrophotometer.

The present invention contains hydrazine or its salt as a reducing agent for precipitating Pd. As explained above, a conventional electroless Pd plating solution commonly uses formic acid besides hydrazine. The present inventors have found that solely use of formic acid as a reducing agent exhibits fine bath stability but significantly reduces the deposition rate of the plating film by the elution of the etching resist and reduces the deposition rate during long-term use as shown in No. 15 in Table 2 below.

Use of hydrazine or its salt instead of formic acid as a reducing agent suppresses deposition rate decrease caused by elution of etching resist in the new bath in the range from the acidic to the neutral as shown in Nos. 20, 21 in Table 2 below. However, this case showed reduction of the deposition rate by the elution of the etching resist during continuous use of the etching resist and reduction of the deposition rate during long-term use. In addition, the bath stability was slightly reduced in the neutral range as shown in No. 21 in Table 2 below.

As a result of studies based on above results, the present invention uses hydrazine or its salt as a reducing agent and the present invention has solved the above problems of solely use of hydrazine or its salt by supplemental use of the compound of the formula (1) or (2), described later in detail. In the present invention, examples of hydrazine or its salt includes hydrazine; hydrazine salts such as hydrazine monohydrobromide, hydrazine dihydrobromide hydrate, hydrazine carbonate, hydrazine sulfate, dihydrazinium sulfate, hydrazine hydrochloride and hydrazine acetate. These examples may be used alone or two or more of them may be used in any combination.

The concentration of hydrazine or its salt in the electroless Pd plating solution is preferably 0.1 g/L or more, more preferably 0.3 g/L or more, further preferably 0.5 g/L or more, still more preferably 1 g/L or more and preferably 100 g/L or less, more preferably 50 g/L or less, further preferably 20 g/L. L or less, and still more preferably 15 g/L or less. The content of hydrazine or its salt is a content of a singly used hydrazine or its salt or a total content of two or more of hydrazine or its salt.

The present invention contains at least hydrazine or its salt as a reducing agent, and may contain other reducing agent(s) in addition to hydrazine or its salt. That is, the present invention may solely use of hydrazine or its salt or combined use of hydrazine or its salt with other reducing agent(s). The present inventors have confirmed that a plating solution satisfying the requirements of the present invention exhibits a desired effect even in the case that the plating solution contains other reducing agent(s) in addition to hydrazine or its salt as shown in No. 11 containing hydrazine and formic acid, and No. 12 containing hydrazine and sodium hypophosphite in Table 1 below.

The type of "other reducing agent" used in the present invention is not particularly limited as long as the other reducing agent is selected from a widely used reducing agent in electroless Pd plating. Examples of other reducing agent include the aforementioned formic acid or its salt, hypophosphorous acid or its salt, phosphorous acid or its salt, an amine borane compound, a hydroboron compound, formalin, ascorbic acid or its salt. Examples of the salt include alkali metal salts such as potassium and sodium; alkaline earth metal salts such as magnesium and calcium; ammonium salts, quaternary ammonium salts, amine salts containing primary to tertiary amines. These examples may be used alone, or two or more of them may be used in any combination. The concentration of the other reducing agent in the electroless Pd plating solution is preferably 0.1 g/L or more, more preferably 0.3 g/L or more, further preferably 0.5 g/L or more, still more preferably 1 g/L or more, and preferably 100 g/L or less, more preferably 50 g/L or less, further preferably 20 g/L or less, and still more preferably 15 g/L or less. The content of the other reducing agent is a content of a singly used other reducing agent or a total content of two or more of other reducing agents.

Next, the compound of the formula (1) or (2) which characterizes the present invention most is explained. As the common point, these compounds has $NH_2NHCO$ in the formula. Experiments by the present inventors surprisingly reveal that only combined used of a compound having $NH_2NHCO$ in the formula with hydrazine or its salt solves the above problem.

As described above, solely use of a reducing agent does not exhibit the desired effect. However, combined used of at least hydrazine or its salt as a reducing agent with a specified compound attains excellent plating bath stability in the range from the acidic to the neutral, specifically pH of 8 or lower, and a new effect which is unobtainable by a reducing agent alone. The new effect is suppression of the deposition rate reduction by the elution of the etching resist and of the deposition rate reduction during long-term use. These effect is particular to the present invention and can only be attained by using the specified compound, and cannot be attained by using other compounds except the above specified compound as shown in Nos. 16 to 19 in table 2 below.

The compound of formula (1) or (2) may be used alone, or two or more of them may be used in any combination. The compound of formula (1) or (2) has $NH_2NHCO$ in the formula as a common feature. According to the studies by the present inventors, a compound without $NH_2NHCO$ does not exhibit the desired effect even if the compound has a similar structure to the compound of formula (1) or (2). See No. 16 using urea, No. 17 using ethyl carbamate, No. 18 using succinic acid 2,2-dimethylhydrazide, No. 19 using maleic hydrazide in Table 2 below. These results indicate that combined used of hydrazine or its salt with a compound having $NH_2NHCO$ in its structure compound solves the above problem although the detailed mechanism is unknown.

The compound of formula (1) of the present invention is represented by $NH_2NHCOR_1$. In the formula, $R_1$ represents H, $NH_2$, an alkyl group having 1 to 10 carbon atoms, an alkoxy group having 1 to 10 carbon atoms, $NHNH_2$, or an aromatic group. Each of these groups may have a substituent. The compound may be a salt such as a hydrochloride, a sulfate, a nitrate, an acetate and an ammonium salt.

The alkyl group is not particularly limited as long as it has 1 to 10 carbon atoms, and may be linear, branched or cyclic. Examples of the alkyl group include a linear or a branched alkyl group such as methyl group, ethyl group, propyl group, isopropyl group, n-butyl group, isobutyl group, t-butyl group, pentyl group, hexyl group, heptyl group, octyl group, nonyl group, decyl group; an alicyclic alkyl group such as cyclopropyl group, cyclobutyl group, cyclopentyl group, cyclohexyl group, cycloheptyl group, cyclooctyl group, cyclononyl group and cyclodecyl group.

The alkoxy group is not particularly limited as long as it has 1 to 10 carbon atoms, and an alkyl group in the alkoxy group may be linear, branched or cyclic. Examples of the alkoxy group includes methoxy group, ethoxy group, propoxy group, butoxy group, pentyloxy group, hexyloxy group, heptyloxy group, octyloxy group, nonyloxy group and decyloxy group.

The aromatic group means a group having an aromatic ring. Examples of the aromatic ring include a non-benzene based aromatic ring; a benzene ring; a condensed aromatic ring such as naphthalene ring and anthracene ring; and pyrene ring.

Each of these groups in the formula (1) may have a substituent. Examples of the substituent include an aromatic group having an aromatic ring; a halogen such as chlorine and fluorine; a hydroxyl group, a carboxy group, an alkoxy group, a cyano group, a nitro group, an amino group, and a sulfo group. Examples of the aromatic ring include benzene-based aromatic rings such as benzene, naphthalene, and anthracene; heteroaromatic rings such as furan and thiophene; and a non-benzene-based aromatic ring.

Typical examples of the compound of the formula (1) exemplified in Nos. 1 to 3, 5 to 8, 11, 12, and 14 in Table 1 below, but not limited thereto. For example, No. 14 using 4-aminobenzohydrazide in Table 1 shows an example of a compound having an aromatic group. And No. 14 shows one example of a benzohydrazine having an amino group as a substituent at the 4-position of benzohydrazine. Another usable compound in this example may be benzohydrazine, or benzohydrazine having a substituent other than the amino group.

The compound of formula (2) of the present invention is represented by $(NH_2NHCO)_2(R_2)n$. In the formula, $R_2$ represents $(CH_2)$ or an aromatic group. Each of these groups may have a substituent. And n represents an integer of 0 to 10. The compound may be a salt such as a hydrochloride, a sulfate, a nitrate, an acetate and an ammonium salt.

The details of the aromatic group are the same as those of the compound of the above formula (1).

The compound of the above formula (2) may have a substituent.

Examples of the substituent include those exemplified in the compound of the above formula (1).

Typical examples of the compound of the formula (2) exemplified in Nos. 4, 9, 10, and 13 in Table 1 below, but not limited thereto. For example, No. 13 using isophthalic acid dihydrazide in Table 1 shows an example of a dihydrazide compound having an aromatic group. No. 13 shows one example of phthalic acid dihydrazide, and isomer thereof such as terephthalic acid dihydrazide may be used.

The compound of formula (1) is preferably used in the present invention.

The concentration of the compound of formula (1) or formula (2) in the electroless Pd plating solution is preferably 0.05 g/L or more, more preferably 0.1 g/L or more, further preferably 0.3 g/L or more, still more preferably 0.5 g/L or more, and preferably 100 g/L or less, more preferably 50 g/L or less, further preferably 20 g/L or less, still more preferably 15 g/L or less.

The concentration of the compound is a content of a single use of the compound or a total content of two or more of the compounds.

Further, the plating solution of the present invention exerts an effect in the vicinity from the acidic to the neutral range, and the pH of the plating solution is 8 or less. A plating solution having pH over 8 decreases its bath stability. See No. 22 in Table 2 below. The lower limit of the pH of the plating solution is not particularly limited from the above viewpoint, but extremely low pH may decreases a plating rate, and therefore the pH is preferably 4 or more.

The electroless Pd plating solution of the present invention may contain additional additives such as widely used in the field of the plating solution. Examples of the additional additives include complexing agents, pH adjusters, stabilizers and surfactants.

The complexing agents usable in the present invention has a function of stabilizing the solubility of Pd in the electroless Pd plating solution. The present invention can use any known complexing agents. The complexing agent is preferably at least one selected from the group consisting of ammonia and amine compounds, and more preferably amine compounds. Examples of the amine compound include methylamine, dimethylamine, trimethylamine, benzylamine, methylenediamine, ethylenediamine, ethylenediamine derivative, tetramethylenediamine, diethylenetriamine, ethylene diamine tetraacetic acid (EDTA), or its alkali metal salt, EDTA derivative, glycine and the like. The complexing agent can be used alone or in combination of two or more kinds. The content of the complexing agent in the electroless Pd plating solution is, appropriately adjusted so as to obtain the above-mentioned function, preferably 0.5 g/L or more, more preferably 1 g/L or more, further preferably 3 g/L or more, still more preferably 5 g/L or more, and preferably 50 g/L or less, more preferably 30 g/L or less. The content of the complexing agent is a content of a single use of the complexing agent or a total content of two or more of complexing agents.

The electroless Pd plating solution of the present invention may contain a pH adjustor for controlling the pH within a specified range. Examples of the pH adjusting agent include acids such as hydrochloric acid, sulfuric acid, nitric acid, citric acid, malonic acid, malic acid, tartaric acid and phosphoric acid; alkalis such as sodium hydroxide, potassium hydroxide and aqueous ammonia. These pH adjusters can be used alone or in combination of two or more kinds.

The stabilizer is added as necessary for improving plating stability, improving the appearance after plating, adjusting the plating film formation rate and the like. The present invention can use any known stabilizers.

The surfactant is added as necessary for improving stability, preventing pits, improving the appearance of plating, and the like. The present invention can use any known surfactants and examples include various nonionic, cationic, anionic, and amphoteric surfactants.

2. Pd Plating Film

The Pd plating film of the present invention is obtained by the above electroless Pd plating solution. The Pd plating film may be a pure Pd film or a Pd alloy plating film containing an alloy component because the Pd plating film may contain elements other than Pd derived from the type of reducing agent. Further, Pd plating film may contain components derived from the above-mentioned various additives. The balance of the Pd plating film is Pd and inevitable impurities.

For example, using hydrazine or its salt, or formic acid or its salt as the reducing agent produces a pure Pd film. For another example, using a phosphoric acid compound such as hypophosphite or phosphite as a reducing agent other than hydrazine or its salt produces a Pd plating film containing P. For other example, using a boron compound such as an amine borane compound or a hydroboron compound as a reducing agent other than hydrazine or its salt produces a Pd plating film containing B. For other example, using a phosphoric acid compound and a boron compound as reducing agents other than hydrazine or its salt produce a Pd plating film containing both P and B.

A preferred embodiment of the present invention includes a laminated plating film having the above Pd plating film and an Au plating film. The present invention takes any bases for forming a Pd plating film and examples of the bases include various known base such as Al, Al-based alloys, Cu and Cu-based alloys; a plating film coated with a catalytic metal such as Fe, Co, Ni, Cu, Zn, Ag, Au, Pt, and its alloy for reduction precipitation of a Pd plating film. Also, the present invention can use a metal having no catalytic property as an object to be plated by various methods.

Another preferred embodiment of the present invention includes a laminated plating film (electroless Ni/Pd/Au plating film) having a Ni plating film formed on an electrode of Al or Al-based alloy, Cu or Cu-based alloy, a Pd plating film on the Ni plating film and an Au plating film on the Pd plating film. Hereinafter, a method for producing the laminated plating film having a Pd plating film of the present invention will be described based on the ENEPIG process. The conditions for forming the Pd plating film are not limited to below, and can be appropriately adjusted based on known technique.

The present invention can appropriately select any known plating conditions and plating equipment for an electroless Ni plating using a Ni plating solution. Example conditions include contacting an object to be plated with an electroless Ni plating solution at temperatures of from 50° C. to 95° C. for about 15 minutes to 60 minutes. A Ni plating film can appropriately set its thickness based on the required characteristics. The thickness of the Ni plating film is usually about 3 μm to 7 μm. The present invention can use various known compositions such as Ni—P alloy and Ni—B alloy for the electroless Ni plating solution.

The present invention can appropriately select any known plating conditions and plating equipment for the electroless Pd plating using the electroless Pd plating solution of the present invention. Example conditions include contacting the object coated with the Ni plating film with an electroless Pd plating solution at temperatures of from 50° C. to 95° C. for about 15 minutes to 60 minutes. A Pd plating film can appropriately set its thickness based on the required characteristics. The thickness of the Pd plating film is usually about 0.001 μm to 0.5 μm.

The present invention can appropriately select any known plating conditions and plating equipment for the electroless Au plating using the electroless Au plating solution. Example conditions include contacting the object coated with the Pd plating film with an electroless Au plating solution at temperatures of from 40° C. to 90° C. for about 3 minutes to 20 minutes. An Au plating film can appropriately set its thickness based on the required characteristics. The thickness of the Au plating film is usually about 0.01 μm to 2 μm.

3. Electronic Equipment Component

Another preferred embodiment of the present invention includes an electronic equipment component having the above plating film. Examples of electronic equipment components include electronic equipment parts such as chip components, crystal oscillators, bumps, connectors, lead frames, hoop materials, semiconductor packages, and printed circuit boards.

The present application claims the benefit of the priority date of Japanese patent application No. 2018-027631, filed on Feb. 20, 2018. The entire contents of the specification of Japanese Patent Application No. 2018-027631, filed on Feb. 20, 2018 are incorporated herein by reference.

EXAMPLES

Next, the present invention will be described more concretely by way of Examples and Comparative Examples. However, the present invention is by no means limited by modes of the Examples, and may appropriately be modified within a range not deviated from the gist of the present invention.

The following characteristics were evaluated using plating baths containing various plating solutions in Tables 1 and 3 as present inventive examples and Table 2 as comparative examples.

(1) Evaluation of Bath Stability

The plating bath in Table 1, Table 3 as present inventive examples and Table 2 as comparative examples was placed in a beaker, and the temperature (55° C. to 65° C.) in Tables 1 to 3 was applied for 8 hours a day for five days a week and repeated this treatment for 4 weeks. Note that plating was not performed during this period. After 4 weeks of the treatment, the state of the plating bath was visually observed. Specifically, existence of decomposition of the plating bath and existence of Pd precipitation which indicates decomposition were visually observed. The bath stability was evaluated according to the following standard:

Stable: no decomposition of the plating bath and no deposition of Pd in the beaker Slightly unstable: no decomposition of the plating bath, but slight precipitation of Pd in the beaker Unstable: decomposition of the plating bath and precipitation of Pd in the beaker Evaluation of (2) and (3) below was conducted for studying the influence of the elution of the etching resist.

(2) Etching Resist Effect (1): Evaluation in New Bath

As a substrate, a BGA substrate (Ball Grid Array: 5 cm×5 cm manufactured by Uyemura Co., Ltd.) and an etching resist coating substrate A obtained by coating the BGA substrate with commercially available etching resist at intervals of 100 μm were prepared. For each substrate, the plating treatments in Table 4 were sequentially performed using a plating bath containing various plating solutions in Tables 1 and 3 as present inventive examples and Table 2 as comparative examples. After forming a laminated plating film having a Ni plating film and a Pd plating film formed in this order from the substrate, the deposition rate of the Pd film after the plating treatments (μm/5 min, also called plating rate) was measured. The deposition rate of the Pd film was measured with a film thickness meter [XDV-μ fluorescent X-ray measuring instrument manufactured by Fischer Instruments]. For a substrate A coated with etching resist, the deposition rate of the Pd film was measured between the etching resists being considered to be easily affected by the dissolution of the etching resist. Next, the deposition rates of both substrates were compared, and the etching resist effect was evaluated according to the following standard. In this example, rated A and B were evaluated as being excellent, which is acceptance standard, in the etching resist resistance in the new bath.

A: a decrease rate of a deposition rate X2 of a etching resist coated substrate A is less than 20% with respect to a deposition rate X1 of a BGA substrate B: a decrease rate of a deposition rate X2 is 20% or more and 40% or less with respect to a deposition rate X1

C: a decrease rate of a deposition rate X2 is 40% or more with respect to a deposition rate X1

(3) Etching Resist Effect (2): Evaluation of Continuous Use of Etching Resist

The effect of continuous use of etching resist coated substrates was evaluated.

Specifically, as a plating film forming substrate, the BGA substrate of above (2) was prepared; and as an etching resist coated substrate, a substrate (etching resist coated substrate B) was prepared by coating 50% of a solder resist (SR) total area with the same type of etching resist as used in above (2) after preparing a substrate by applying a solder resist (SR) over the entire surface of glass epoxy. Note that, unlike BGA substrate, the glass epoxy has no plating surface. The etching resist coated substrate B was used only for eluting the etching resist.

First, the plating treatment to the BGA substrate was performed as in above (2), and the deposition rate Y1 of the Pd film was measured. Next, the above etching resist coated substrate B was immersed in each plating bath for 5 hours under the condition (5 dm$^2$/L) that the surface area of the etching resist was 5 dm$^2$/L with respect to 1 L of the plating bath. Using this plating bath, the plating treatments to the BGA substrate was performed as in above (2), and the deposition rate Y2 of the Pd film was measured.

Next, the deposition rates Y1 and Y2 were compared, and the etching resist effect was evaluated based on the following standard. In this example, rated A was evaluated as being excellent, which is acceptance standard, in etching resist resistance during continuous use.

A: a decrease rate of a deposition rate Y2 of a BGA substrate after continuous use of etching resist is less than 20% with respect to a deposition rate Y1 of a BGA substrate B: a decrease rate of a deposition rate Y2 is 20% or more and 40% or less with respect to a deposition rate Y1

C: a decrease rate of a deposition rate Y2 is 40% or more with respect to a deposition rate Y1

(4) Evaluation of long-term stability of deposition rate

The BGA substrate of the above (2) and (3) was used in this evaluation. The treatment of maintaining the temperature (55° C. to 65° C.) in Tables 1 to 3 was performed for 8 hours a day for five days a week and repeated this treatment for 4 weeks. After 4 weeks of the treatment, a deposition rate of a Pd film was measured. The deposition rate Z2 after 4 weeks was compared with the initial plating rate Z1 at a time of initial bath makeup, and the long-term stability was evaluated based on the following standard. In this example, rated A and B were evaluated as being excellent, which is acceptance standard, in long-term stability.

A: a decrease rate of a deposition rate Z2 after 4 weeks is less than 20% with respect to a initial plating rate Z1 at a time of initial bath makeup B: a decrease rate of a deposition rate Z2 is 20% or more and 40% or less with respect to a deposition rate Z1

C: a decrease rate of a deposition rate Z2 is 40% or more with respect to a deposition rate Z1

These results are shown in Tables 1 to 3.

TABLE 1

| Composition of Pd plating solution | | No. 1 | No. 2 | No. 3 | No. 4 | No. 5 | No. 6 | No. 7 | No. 8 | No. 9 | No. 10 | No. 11 | No. 12 | No. 13 | No. 14 |
|---|---|---|---|---|---|---|---|---|---|---|---|---|---|---|---|
| Water-soluble Pd compound (g/L, based on Pd) | tetraamine palladium hydrochloride | 1 | | | | 1 | 1 | 1 | 1 | 1 | 1 | 1 | 1 | 1 | 1 |
| | tetraamine palladium sulfate | | 1 | | | | | | | | | | | | |
| | palladium chloride | | | 1 | | | | | | | | | | | |
| | palladium sulfate | | | | 1 | | | | | | | | | | |
| Reducing agent (g/L) | hydrazine | 3 | 3 | 3 | 3 | 3 | 3 | 3 | 3 | 3 | 3 | 2 | 2 | 3 | 3 |
| | sodium formate | | | | | | | | | | | 15 | | | |
| | sodium hypophosphite | | | | | | | | | | | | 1 | | |
| Complexing agent (g/L) | ethylenediamine | 3 | 3 | 3 | 3 | 3 | 3 | 3 | 3 | 3 | 3 | 3 | 3 | 3 | 3 |
| | EDTA | 10 | 10 | 10 | 10 | 10 | 10 | 10 | 10 | 10 | 10 | 10 | 10 | 10 | 10 |
| Compound (g/L) | NH$_2$NHCONH$_2$•HCl | 2 | | | | 2 | | | | | | | 2 | 2 | |
| | NH$_2$NHCOOC$_2$H$_5$ | | 2 | | | | | | | | | | | | |
| | NH$_2$NHCOCH$_3$ | | | 2 | | | | | | | | | | | |
| | NH$_2$NHCOCH$_2$CONHNH$_2$ | | | | 2 | | | | | | | | | | |
| | NH$_2$NHCOH | | | | | | 2 | | | | | | | | |
| | PhCH$_2$CONHNH$_2$ | | | | | | | 0.5 | | | | | | | |

TABLE 1-continued

| Composition of Pd plating solution | | No. 1 | No. 2 | No. 3 | No. 4 | No. 5 | No. 6 | No. 7 | No. 8 | No. 9 | No. 10 | No. 11 | No. 12 | No. 13 | No. 14 |
|---|---|---|---|---|---|---|---|---|---|---|---|---|---|---|---|
| | $NH_2NHCONHNH_2$ | | | | | | | | 0.5 | | | | | | |
| | $NH_2NHCOCONHNH_2$ | | | | | | | | | | 0.5 | | | | |
| | $NH_2NHCO(CH_2)_4CONHNH_2$ | | | | | | | | | | | 0.5 | | | |
| | isophthalic acid dihydrazide | | | | | | | | | | | | | 0.5 | |
| | 4-aminobenzohydrazide | | | | | | | | | | | | | | 0.5 |
| | $NH_2CONH_2$ | | | | | | | | | | | | | | |
| | $NH_2COOC_2H_5$ | | | | | | | | | | | | | | |
| | $N(CH_3)_2NHCOCH_2CH_2COOH$ | | | | | | | | | | | | | | |
| | maleic hydrazide | | | | | | | | | | | | | | |
| | pH | 5 | 5 | 5 | 5 | 4 | 7 | 5 | 5 | 5 | 5 | 5 | 5 | 5 | 5 |
| | Temperature(° C.) | 65 | 65 | 65 | 65 | 65 | 65 | 65 | 65 | 65 | 65 | 60 | 65 | 65 | 65 |
| | Deposition rate at the time of initial bath makeup (μm/5 min) | 0.05 | 0.06 | 0.06 | 0.05 | 0.05 | 0.07 | 0.05 | 0.05 | 0.06 | 0.05 | 0.07 | 0.06 | 0.05 | 0.05 |
| Evaluation | Bath stability | Stable | Stable | Stable | Stable | Stable | Stable | Stable | Stable | Stable | Stable | Stable | Stable | Stable | Stable |
| | Etching resist impact (1) | A | A | A | A | A | A | A | A | A | A | B | A | A | A |
| | Etching resist impact (2) | A | A | A | A | A | A | A | A | A | A | A | A | A | A |
| | long-term stability of deposition rate | A | A | A | A | A | A | A | A | A | A | B | B | A | A |

TABLE 2

| Composition of Pd plating solution | | No. 15 | No. 16 | No. 17 | No. 18 | No. 19 | No. 20 | No. 21 | No. 22 |
|---|---|---|---|---|---|---|---|---|---|
| Water-soluble Pd compound (g/L, based on Pd) | tetraamine palladium hydrochloride | 1 | 1 | 1 | 1 | 1 | 1 | 1 | 1 |
| | tetraamine palladium sulfate | | | | | | | | |
| | palladium chloride | | | | | | | | |
| | palladium sulfate | | | | | | | | |
| Reducing agent (g/L) | hydrazine | | 3 | 3 | 3 | 3 | 3 | 3 | 3 |
| | sodium formate | 25 | | | | | | | |
| | sodium hypophosphite | | | | | | | | |
| Complexing agent (g/L) | ethylenediamine | 3 | 3 | 3 | 3 | 3 | 3 | 3 | 3 |
| | EDTA | 10 | 10 | 10 | 10 | 10 | 10 | 10 | 10 |
| Compound (g/L) | $NH_2NHCONH_2 \cdot HCl$ | 2 | | | | | | | 2 |
| | $NH_2NHCOOC_2H_5$ | | | | | | | | |
| | $NH_2NHCOCH_3$ | | | | | | | | |
| | $NH_2NHCOCH_2CONHNH_2$ | | | | | | | | |
| | $NH_2NHCOH$ | | | | | | | | |
| | $PhCH_2CONHNH_2$ | | | | | | | | |
| | $NH_2NHCONHNH_2$ | | | | | | | | |
| | $NH_2NHCOCONHNH_2$ | | | | | | | | |
| | $NH_2NHCO(CH_2)_4CONHNH_2$ | | | | | | | | |
| | isophthalic acid dihydrazide | | | | | | | | |
| | 4-aminobenzohydrazide | | | | | | | | |
| | $NH_2CONH_2$ | | 2 | | | | | | |
| | $NH_2COOC_2H_5$ | | | 2 | | | | | |
| | $N(CH_3)_2NHCOCH_2CH_2COOH$ | | | | 0.5 | | | | |
| | maleic hydrazide | | | | | 0.5 | | | |
| | pH | 5 | 5 | 5 | 5 | 5 | 5 | 7 | 9 |
| | Temperature(° C.) | 55 | 65 | 65 | 65 | 65 | 65 | 65 | 65 |
| | Deposition rate at the time of initial bath makeup (μm/5 min) | 0.07 | 0.05 | 0.06 | 0.05 | 0.04 | 0.05 | 0.07 | 0.07 |
| Evaluation | Bath stability | Stable | Stable | Stable | Stable | Stable | Stable | Slightly unstable | Unstable |
| | Etching resist impact (1) | C | A | A | A | A | A | A | B |
| | Etching resist impact (2) | C | B | B | B | B | B | C | C |
| | long-term stability of deposition rate | C | C | C | C | C | C | C | — |

TABLE 3

| Composition of Pd plating solution | | No. 23 | No. 24 | No. 25 | No. 26 | No. 27 | No. 28 | No. 29 | No. 30 |
|---|---|---|---|---|---|---|---|---|---|
| Water-soluble Pd compound (g/L, based on Pd) | tetraamine palladium hydrochloride | 1 | 1 | 1 | 1 | 1 | 1 | 1 | 1 |
| | tetraamine palladium sulfate | | | | | | | | |
| | palladium chloride | | | | | | | | |
| | palladium sulfate | | | | | | | | |
| Reducing agent | hydrazine | | | | | | | | |

TABLE 3-continued

| Composition of Pd plating solution | | No. 23 | No. 24 | No. 25 | No. 26 | No. 27 | No. 28 | No. 29 | No. 30 |
|---|---|---|---|---|---|---|---|---|---|
| (g/L) | hydrazinium dichloride | 3 | | | | | | | |
| | hydrazinium monochloride | | 3 | | | | | | |
| | hydrazine acetate | | | 3 | | | | | |
| | hydrazine carbonate | | | | 3 | | | | |
| | hydrazine monohydrobromide | | | | | 3 | | | |
| | dihydrazine sulfate | | | | | | 3 | | |
| | hydrazinium dibromide hydrate | | | | | | | 3 | |
| | hydrazine sulfate | | | | | | | | 3 |
| | sodium formate | | | | | | | | |
| | sodium hypophosphite | | | | | | | | |
| Complexing agent (g/L) | ethylenediamine | 3 | 3 | 3 | 3 | 3 | 3 | 3 | 3 |
| | EDTA | 10 | 10 | 10 | 10 | 10 | 10 | 10 | 10 |
| Compound (g/L) | $NH_2NHCONH_2 \cdot HCl$ | 0.1 | 20 | 1 | 1 | 2 | 2 | 2 | 2 |
| | $NH_2NHCOOC_2H_5$ | | | 1 | | | | | |
| | $NH_2NHCOCH_3$ | | | | | | | | |
| | $NH_2NHCOCH_2CONHNH_2$ | | | | | | | | |
| | $NH_2NHCOH$ | | | | | | | | |
| | $PhCH_2CONHNH_2$ | | | | | | | | |
| | $NH_2NHCONHNH_2$ | | | | 1 | | | | |
| | $NH_2NHCOCONHNH_2$ | | | | | | | | |
| | $NH_2NHCO(CH_2)_4CONHNH_2$ | | | | | | | | |
| | isophthalic acid dihydrazide | | | | | | | | |
| | 4-aminobenzohydrazide | | | | | | | | |
| | $NH_2CONH_2$ | | | | | | | | |
| | $NH_2COOC_2H_5$ | | | | | | | | |
| | $N(CH_3)_2NHCOCH_2CH_2COOH$ | | | | | | | | |
| | maleic hydrazide | | | | | | | | |
| | pH | 5 | 5 | 5 | 5 | 5 | 5 | 5 | 8 |
| | Temperature(° C.) | 65 | 65 | 65 | 65 | 65 | 65 | 65 | 65 |
| Deposition rate at the time of initial bath makeup (μm/5 min) | | 0.05 | 0.06 | 0.05 | 0.05 | 0.04 | 0.05 | 0.04 | 0.06 |
| Evaluation | Bath stability | Stable | Stable | Stable | Stable | Stable | Stable | Stable | Stable |
| | Etching resist impact (1) | A | A | A | A | A | A | A | B |
| | Etching resist impact (2) | A | A | A | A | A | A | A | A |
| | long-term stability of deposition rate | B | A | A | A | A | A | A | A |

TABLE 4

| Process | Chemical | Temperature(° C.) | Time (min) |
|---|---|---|---|
| cleaner | ACL-007 (C. Uyemura) | 50 | 5 |
| soft etching | sodium persulfate 100 g/L sulfuric acid 10 g/L | 25 | 1 |
| acid rinse | sulfuric acid 50 g/L | 25 | 1 |
| pre-dip | sulfuric acid 20 g/L | 25 | 1 |
| activator | MNK-4 (C. Uyemura) | 30 | 2 |
| electroless nickel plating | NPR-4 (C. Uyemura) | 80 | 30 |
| electroless palladium plating | Tables 1 to 3 | | |

The following can be considered from Tables 1 to 3.

Nos. 1 to 14 in Table 1 are the present inventive examples using a plating solution satisfying the requirements of the present invention. For details, Nos. 1, 6, 11, and 12 use semicarbazide hydrochloride, No. 2 uses ethyl carbazate, No. 3 uses acetohydrazide, No. 4 uses malonic acid dihydrazide, No. 5 uses formohydrazide, No. 7 uses phenylacetic acid hydrazide, No. 8 uses carbohydrazide, No. 9 uses oxalyl dihydrazide, No. 10 uses adipic acid hydrazide, No. 13 uses isophthalic acid dihydrazide, No. 14 uses 4-aminobenzohydrazide. Among them, Nos. 4, 9, 10, and 13 are the compounds of the above (2), and the others are the compounds of the above (1).

Nos. 23 to 30 in Table 3 are the present inventive examples using a plating solution satisfying the requirements of the present invention. Nos. 23 to 30 are examples of combined use of hydrazine salt as a reducing agent and a compound of the above (1) and/or a compound of the above (2).

These present inventive examples showed that combined used of hydrazine or its salt with a specified compound attains excellent plating bath stability and long-term stability within the acidic to the neutral range of pH, and provides no adverse effect of the etching resist elution.

Nos. 15 to 22 in Table 2 are comparative examples using a plating solution unsatisfying any of the requirements of the present invention, and have the following problems.

No. 15 is an example of using formate instead of hydrazine as a reducing agent. This example exhibits adverse effect of the etching resist elution even using the specified compound of the present invention. Weaker reducing power of formic acid than that of hydrazine may attribute this results. In addition, No. 15 showed decreased long-term stability.

Nos. 16 to 19 are examples using hydrazine as a reducing agent, but using other compounds instead of the specified compound of the present invention. These examples showed decreased long-term stability, and decreased etching resist resistance during continuous use (etching resist effect (2)). For details, No. 16 uses urea, No. 17 uses ethyl carbamate, No. 18 uses succinic acid 2,2-dimethylhydrazide, No. 19 uses maleic hydrazide. None of these examples has $NH_2NHCO$ in the compound, which hamper complete elimination of adverse effects of sole addition of hydrazine and brought the above results.

Nos. 20 and 21 are examples using hydrazine as a reducing agent with no additional compound. These examples showed decreased long-term stability and remarkably decreased etching resist resistance during continuous use as similar to Nos. 16 to 19.

Nos. 20 and 21 differ from each other only in the pH of the plating solution. No. 21 showed decreased bath stability under pH of 7. Comparing No. 21 with No. 6 in Table 1 having same pH, the specified compound of the present invention contributes to improve bath stability.

No. 22 is an example adding pH adjuster to the plating solution of No. 1 to adjust pH to 9. This example showed significantly decreased etching resist resistance during continuous use (etching resist effect (2)) because the etching resist is easily eluted with alkali. In addition, No. 22 showed decreased bath stability and could not evaluate the long-term stability (indicated as "-" in the Table).

These results indicate that the electroless Pd plating solution of the present invention provides a Pd film with excellent bath stability, no adverse effect by etching resist elution, and excellent long-term stability. The electroless Pd plating solution of the present invention is suitable for applications such as electronic parts that require continuous use of an etching resist coated substrate.

The invention claimed is:

1. An electroless palladium plating solution comprising:
   a palladium compound;
   hydrazine or its salt; and
   at least one selected from a group consisting of
   a compound represented by formula (1) or its salt, and
   a compound represented by formula (2) or its salt; and
   wherein the electroless palladium plating solution has a pH of 8 or less:

$$NH_2NHCOR_1 \quad \text{formula (1)},$$

$$(NH_2NHCO)_2(R_2)n \quad \text{formula (2)},$$

wherein $R_1$ represents H, $NH_2$, an alkyl group having 1 to 10 carbon atoms, an alkoxy group having 1 to 10 carbon atoms, $NHNH_2$, or an aromatic group, wherein each of these groups may have a substituent;
   wherein n represents an integer of 0 to 10;
   wherein the $R_2$ in the formula (2) represents $CH_2$ or an aromatic group, wherein each of these groups may have a substituent; and
   wherein either
   (i) when the $R_2$ represents $CH_2$, n is 1, or
   (ii) when the $R_2$ represents an aromatic group, n represents an integer of 1 to 10.

2. The electroless palladium plating solution according to claim 1, further comprising a reducing agent other than hydrazine or its salt.

3. The electroless palladium plating solution according to claim 1, wherein the reducing agent other than hydrazine or its salt is at least one selected from a group consisting of formic acid or its salt, hypophosphorous acid or its salt, and phosphorous acid or its salt.

* * * * *